United States Patent [19]
Vail

[11] 3,986,480
[45] Oct. 19, 1976

[54] ELEVATOR LOCKING AND RELEASE DEVICE FOR BIRDHOUSE

[75] Inventor: Arthur E. Vail, Griggsville, Ill.
[73] Assignee: Trio Manufacturing Company, Griggsville, Ill.
[22] Filed: Apr. 14, 1975
[21] Appl. No.: 567,753

[52] U.S. Cl. .............................. 119/23; 248/410
[51] Int. Cl.² ................................. A01K 31/00
[58] Field of Search ................ 119/23, 51, 52; 248/244, 245, 295, 296, 316–327, 332, 409–415, 122, 221, 328; 240/67–88; 40/145 R; 254/139, 148; 294/74.75; 187/92; 186/22

[56] References Cited
UNITED STATES PATENTS

| 836,303 | 11/1906 | Christensen | 248/410 |
|---|---|---|---|
| 1,235,613 | 8/1917 | Vandergrift | 248/410 |
| 1,429,784 | 9/1922 | Sievert | 248/295 |
| 2,664,259 | 12/1953 | Rose | 248/321 |
| 3,367,632 | 2/1968 | Vail | 254/139 |
| 3,696,792 | 10/1972 | Bruhns | 119/23 |
| 3,814,059 | 6/1974 | Eickhof | 119/23 |

Primary Examiner—Louis G. Mancene
Assistant Examiner—Peter K. Skiff
Attorney, Agent, or Firm—Silverman & Cass, Ltd.

[57] ABSTRACT

A locking device for releasably securing a birdhouse upon its mounting pole. A locking plate secured to the bottom of the birdhouse has an opening through which the mounting pole is passed. The plate opening is larger in diameter than the outside diameter of the post. The plate is biased into a locking position at an angle relative to the axis of the post. A pivotal bracket is operable on the plate to bias the plate to a horizontal release position normal to the axis of the post. A lanyard secured to the bottom of the birdhouse is passed up the pole around a pulley wheel at the top thereof and returned down the pole through the bracket. A free end of the lanyard extends below the bracket. Pivoting of the bracket and resultant release of the locking plate is accomplished by pulling on the free end of the lanyard at an angle relative to the post to move the locking plate to its release position.

6 Claims, 4 Drawing Figures

ELEVATOR LOCKING AND RELEASE DEVICE FOR BIRDHOUSE

BACKGROUND OF THE INVENTION

1. Field of the Invention

This invention relates to pole-mounted birdhouses and more particularly, to a novel elevator locking and release device for releasably maintaining the birdhouse at a desired elevated position on the pole.

2. Description of the Prior Art

Birdhouses commonly are mounted at an elevated position above ground at the top of a mounting pole. In many instances the birdhouse is mounted at a considerable distance above ground which is not accessable to persons of average height. For instance, where it is desired to provide a birdhouse for habitation by Purple Martins, the house must be elevated between 10 and 15 feet above ground in order to attract the birds to the house.

Since on the one hand the house must be mounted at a considerable distance above ground to attract a desired bird, a convenient way to bring the house down to reach by an average height person must also be provided. Lowering of the house is required to clean the same, effect needed repairs as they arise, and to remove unwanted birds that may have nested. Thus, the mounting pole for the birdhouse preferably includes some elevator means for conveniently raising and lowering the house when desired.

Several types of elevator devices are available. One such device consists of two vertical poles which are hingedly connected together; lowering of the house is accomplished by pivoting the upper pole with respect to the lower one and swinging the house down. This structure is undesirable because it requires tilting of the house and may result in disturbing of birds or eggs which are present in the house when it is being lowered.

An alternate structure for lowering a birdhouse without the need for tilting the same is disclosed in applicant's U.S. Pat. No. 3,367,632 in which means are provided for lowering a birdhouse coaxial with the pole. Locking of the house on the pole is accomplished with a complex winch device, including a ratchet wheel and lever. The structure of U.S. Pat. No. 3,367,632 performs satisfactorily in use with large heavy birdhouses which require relatively heavy-duty equipment to ensure that the house does not fall once it is locked in place. For use with relatively light-weight houses, however, more economical and less complex locking devices are desired.

One structure for accomplishing locking of a birdhouse on its pole without use of a complex winch device is disclosed in Canadian Patent 929,812 issued July 10, 1973. The structure disclosed in the Canadian Patent includes a birdhouse which can be raised and lowered upon its mounting pole by a lanyard fastened to the house and run over a pulley at the top of the pole. The house has a center hole through which the pole passes. A simple rope cleat is secured to the pole near ground level and the lanyard is tied around the cleat to maintain the house in position when it is raised to the top of the pole. While this is a satisfactory method for raising and lowering the house, the rope cleat does not satisfy the need to positively secure the house in position after being raised or lowered, or to prevent accidental falling of the house as raising or lowering is effected. For example, if while raising the house the rope inadvertently is released, the house will fall with possible damage thereto or injury to the person pulling on the rope. Additionally, it is important to maintain the birdhouse at the top of the pole in an immobile position to prevent movement of the house in a horizontal plane. In the structure of the Canadian Patent referred to herein, a bracket is mounted to the ceiling of the house with slots to engage a pin mounted horizontally in the mounting post and thus prevent such undesirable rotation in the horizontal plane, If, however, through carelessness or improper procedure in fastening the lanyard to the rope cleat, the house is left a few inches lower than its extreme upper position, the slot and pin will not properly engage with the result that the house can rotate on the pole. With use of the rope cleat device, even when the house is well engaged in the slot initially, a slight stretch of the lanyard will permit the house to become disengaged with the undesired result.

The structure of the present invention obviates the aforementioned disadvantages by automatically locking the birdhouse in position at the point on the mounting pole where the lanyard is released.

SUMMARY OF THE INVENTION

The invention is characterized by an elevator mechanism for raising and lowering a birdhouse upon a mounting pole passed through a central passageway in the house. A lanyard is secured to the bottom of the house and passed through a pulley assembly at the top of the pole with the free end returned down the pole through the passageway and terminating in a free end of the lanyard. A locking plate is secured to the bottom of the birdhouse and has an opening through which the pole is passed. The plate opening is larger in diameter than the outside diameter of the post. The plate is spring biases into a locking position at an angle relative to the axis of the post. The free end of the lanyard passes through the bracket and is operable thereon to effect pivotal movement. Pivoting of the bracket and resultant release of the locking plate is accomplished by pulling on the free end of the lanyard at an angle relative to the post to move the locking plate to its release position.

DESCRIPTION OF THE PREFERRED EMBODIMENT

Figures 1, 2:
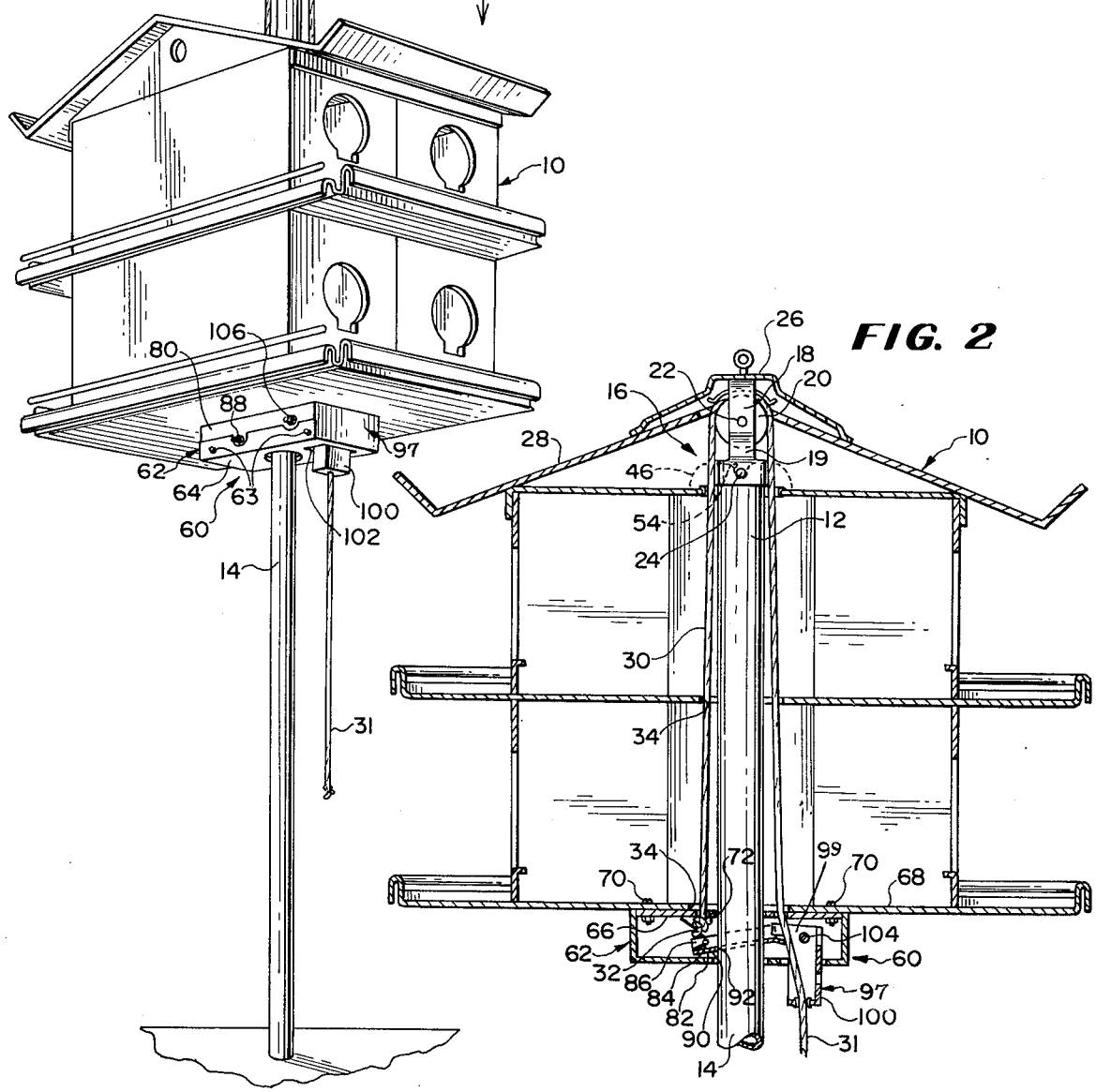
FIG. 1 is a perspective view of a birdhouse having the locking and release device of the invention positioned thereon, said birdhouse being shown in solid-line in its lowered position and in dotted-line in its raised position.
FIG. 2 is a vertical cross-sectional view taken through said house and locking device.

The elevator locking and release device of the invention is suitable for use with any type of birdhouse which is designed to be moved up and down a mounting pole by use of a lanyard. In FIGS. 1 and 2, one type of birdhouse 10 is shown for purposes of illustration only and it is to be understood that the device of the invention will perform equally well with other types of houses.

Birdhouse 10 is a common two-tier, eight-compartment enclosure which is of the type disclosed in Canadian Patent 929,812 for use particularly for Purple Martins. In FIG. 2, the house 10 is shown positioned at the top end 12 of a mounting pole 14. This disposition of the house also is shown in dotted line in FIG. 1, with the house shown in solid line at a lowered position proximate the base of the pole. The mounting pole 14 has a pulley assembly indicated generally 16 secured to the top end 12 of the pole. The assembly 16 includes a pulley support bracket 18 having a reduced upper section 19 in which the pulley 20 is vertically disposed and rotatably secured to the bracket 18 by the pulley support pin 22. There is clearance space between the bottom of pulley 20 and top end 12 so that the pulley is freely rotatable.

A locking pin 24 projects radially outward through the mounting pole 14 and support bracket 18. The pin is horizontally oriented and disposed in a plane parallel to the pulley support pin 22 so that it is parallel to the axis of rotation of the pulley. The locking pin, therefore, does not interfere with the raising and lowering of the birdhouse.

Affixed to the top of the bracket 18 is a cover 26 adapted to engage the roof 28 of the birdhouse 10 when the house is raised to the top of the pole. A lanyard or rope 30 is secured to the bottom of the birdhouse by any suitable means such as a knot 32. The lanyard is passed upwardly through a central passageway 34 in the house, then over the pulley and back down through the central passageway 34 to a free end 31 which hangs free below the birdhouse.

The house 10 includes a guide and locking bracket 46 (FIG. 2) secured to the ceiling of the uppermost tier. The bracket 46 has two upstanding arms, each of which forms a respective locking slot 54. The slots 54 limit the upward travel of the birdhouse by engaging the locking pin 24 when the house is raised to the top of the pole. Moreover, when the locking pin 24 and locking slots 54 are engaged, and so long as they remain engaged, rotation of the birdhouse in the horizontal plane is prevented.

As thus far described, the house 10 is capable of being raised to the top of the pole by pulling on the free end 31 of the lanyard 30. The secured end 32 of the lanyard will thereby move the house upwardly until bracket 46 and pin 24 are engaged to prevent further upward movement of the house and prevent the house from rotatably moving when in its elevated position. The house thereafter is secured in its elevated position by tying the free end 31 of the lanyard around a rope-securing cleat (not shown) affixed to the pole 14 near ground level. While raising the house, or lowering the same by reversing the above-described procedure, if the person performing the operation loses his grip on the lanyard, nothing will prevent the house from falling to the ground. Additionally, if the lanyard is not very tightly secured around the rope cleat, or even if tight securement is achieved but the rope stretches thereafter, the house may move downwardly a short distance with possible disengagement of bracket 46 and pin 24; this will permit undesirable rotation of the house in the horizontal plane.

The locking and release device of the invention provides positive and automatic locking of the house in any position at the point where the lanyard is released. The device 60 is retained within a housing 62 with a cover plate 64 removably positioned over the housing by fasteners 63 to protect the elements retained therein. Housing 62 includes a mounting surface 66 secured to the undersurface of the floor 68 of the lowermost tier of the birdhouse 10 by fasteners such as screws and nuts 70. Mounting surface 66 is provided with a large central aperture 72 to permit passage of pole 14, a smaller aperture 74 through which lanyard 30 passes but terminates with the knot 32, and a similar aperture 76 to permit the lanyard to pass through the mounting surface to the free end 31 of the lanyard. A grommet 78 is positioned within aperture 76 with smooth inner-facing surfaces to prevent fraying of the lanyard as it moves within the grommet.

Housing 62 is formed with a pair of upstanding parallel leg members 80 extending normal to mounting surface 66 and floor 68. A generally channel-shaped locking plate 82 is retained within housing 62 by a pivot pin 84 which passes through apertures 81 in each leg member 80 and also through apertures 83 provided in each upstanding leg 86 of locking plate 82. The apertures 81, 83 are in registry to receive the locking pin 84 which is secured by nuts 88 at either end thereof exterior of the housing 62. Locking plate 82 is formed with a locking surface 90 formed normal to and between legs 86 of the plate. A central opening or aperture 92 is provided in locking surface 90 with the pole 14 passing therethrough. Aperture 92 has a radial dimension slightly larger than the outside diameter of pole 14.

A pair of torsion springs 94 are positioned around pivot pin 84 with the free ends 96, 98 of springs 94 respectively abutting mounting surface 66 and locking surface 90. The torsion springs 94 assert a force against locking plate 82 to force the same into the oblique locking position shown in FIGS. 2 and 4. In the locking position shown, opposite inner facing surfaces of aperture 92 frictionally engage or lock with pole 14 and thereby prevent the house 10 from moving with respect to the pole.

A lever bracket 97 is provided for releasing locking plate 82 to permit movement of house 10. Bracket 97 is of generally L-shaped configuration with a short leg 99 adapted for engagement with locking plate 82 and a longer depending leg 100 passing out of housing 62 through a passageway 102 provided in cover 64. Lever bracket 97 is pivotal within housing 62 about pivot pin 104 which passes through aligned or coaxial apertures in legs 99 of the lever bracket and legs 80 of housing 62 similar to those apertures provided for passage of pivot pin 84. Similarly, pivot pin 104 is secured by nuts 106 at either end thereof exterior of the housing 62. The depending leg 100 of bracket 97 has an aperture 108 with grommet 110 formed therein to permit free end 31 of the lanyard to pass through the bracket.

Figure 4:
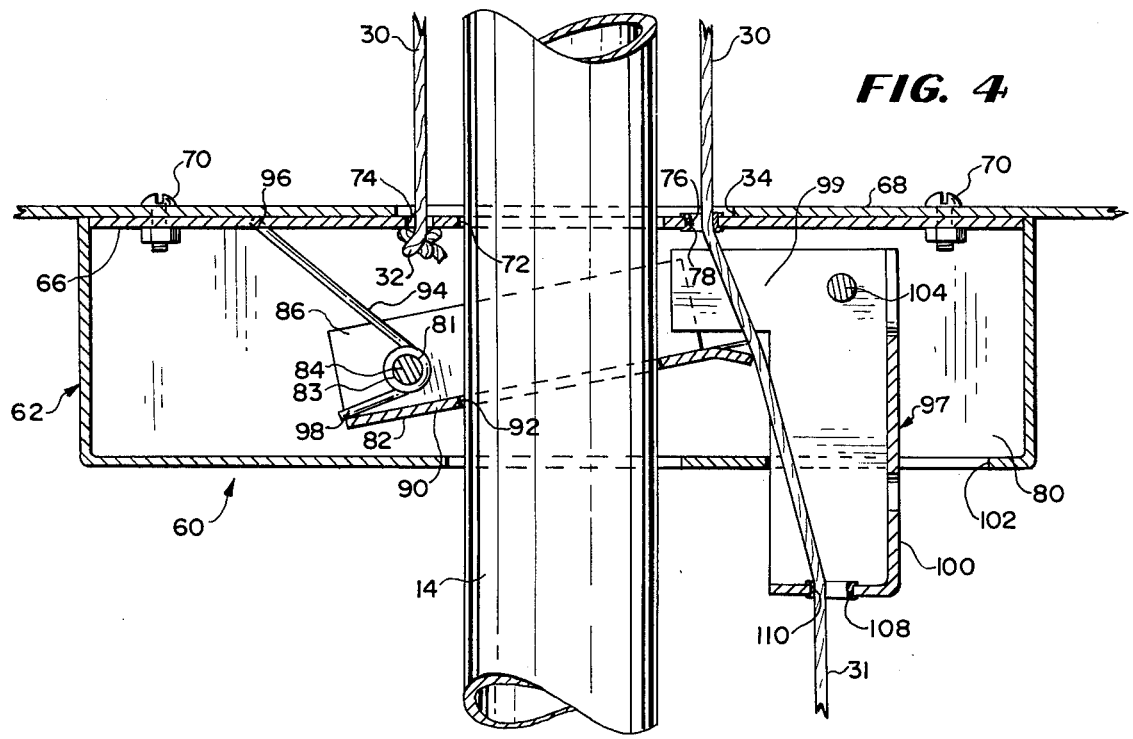
FIG. 4 is a similar view illustrating the locking device in its locked position.

As stated, when lever bracket 97 is not engaged with locking plate 82, the latter is biased by springs 94 to its locking position seen in FIGS. 1, 2 and 4. In this position, the aperture 92 which is only slightly larger than the outside diameter of pole 14 lies in a plane oblique to the axis of the pole. Opposite edges of the aperture are thus in contact with the pole such that the aperture edges grip the pole with sufficient force to prevent the house from moving down the pole. The force needed to ensure proper locking of the plate 82 with respect to pole 14 depending upon the weight of the house 10 can be varied by more or less spring tension in the springs 94.

Figure 3:
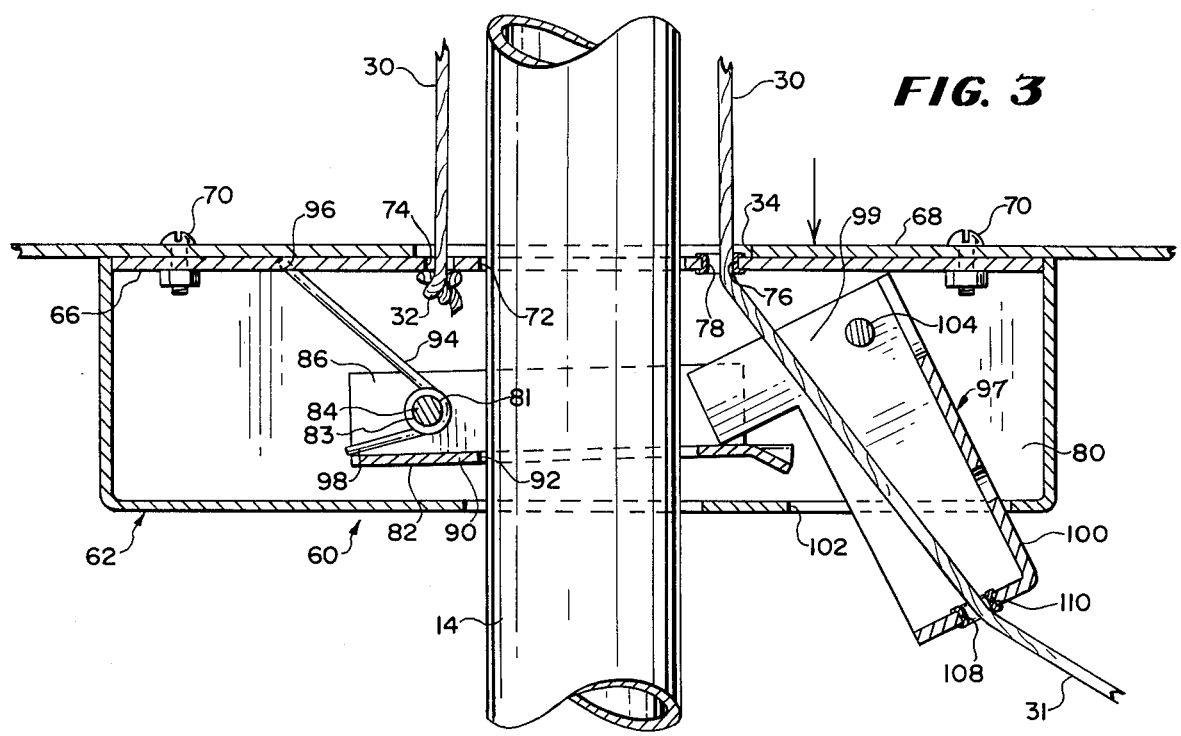
FIG. 3 is an enlarged sectional view taken through the locking device illustrating the same in its release position.

Release of locking plate 82 is accomplished simultaneously with moving free end 31 of lanyard 30 which is the operation the user normally would commence to raise or lower the house. The user will grasp free end 31 and hold the same at an angle to the axis of pole 14 as illustrated in FIG. 3. Movement of free end 31 will cause lanyard 30 to abut grommet 110 and pivot bracket 97 counterclockwise. Short let 99 thereby will engage locking plate 83 to pivot the same clockwise and move the surface 90 to a plane generally normal to the axis of pole 14. In practice, and angle to which lanyard 30 must be moved with respect to the axis of the pole in order to release locking plate 82 has been determined to be about 15°. Upon movement of the lanyard to an angle relative to the post and thereby releasing the locking plate 82, the user can permit the lanyard to slip slowly through his hands and the house can be lowered. To raise the house, the user will pull down on the lanyard at a position parallel to the post and thereby raise the house. Release of the lanyard, either intentionally or unintentionally, will cause the lever bracket 97 automatically to resume its rest position (FIG. 4), immediately release locking plate 82 and lock the house at the position it was in at the time the lanyard was released.

It is to be understood that the elevator locking and release device 60 may be used with alternate objects to perform the same functions described heretofore in connection with a birdhouse. For instance, the device could be used with flags, signs, antennas, etc. where it is desired to raise and or lower an object up and down a pole with ease and safety.

What is desired to secure by Letters Patent of the United States is:

1. An elevator locking and release device for raising and lowering a birdhouse or like object to the top of a pole on which the object is mounted and releasably locking the object at a desired position on the pole which has a pulley as its upper end, said device comprising, a housing secured to the object, a lanyard secured at one end thereof to the housing and passed over the pulley at the top of the pole and returned through the housing to a free end of the lanyard outside of the housing, a locking plate pivotally mounted within the housing, the plate having an opening therein with the pole passing through the opening, the diameter of the opening being larger than the outside diameter of the pole, means to bias the plate at an oblique angle relative to the pole with the perimetric edge of the opening in the plate frictionally engaging against the pole to lock the object and housing thereon, and means operable by the lanyard to release the locking plate to free the object and housing for movement thereof parallel to the longitudinal axis of the pole, said release means comprises a lever bracket pivotally mounted within the housing, the bracket being operable on the plate upon exerting a force on the free end of the lanyard to pivot the plate from the oblique angle relative to the pole and thereby release the object and housing.

2. A device as claimed in claim 1 in which the free end of the lanyard passes through the bracket and pulling on the free end at an angle relative to the pole will move the bracket to engage the plate and pivot the same simultaneously with raising the object and housing on the pole, the bracket being of a generally L-shaped configuration with a first leg adapted to engage the plate and a second substantially enclosed leg extending outside the housing, the free end of the lanyard passing through an opening in the end of the second leg.

3. A device as claimed in claim 1 in which the means to bias the plate includes at least one torsion spring.

4. In combination with a pole-mounted birdhouse, an elevator locking and release device for raising and lowering the birdhouse to the top of the pole and locking the birdhouse at any desired position on the pole, said device comprising, a housing secured to the bottom of the birdhouse, a lanyard secured at one end thereof to the housing and passed through a central passageway in the birdhouse and over a pulley at the top of the pole and returned through the birdhouse passageway and the housing to a free end of the lanyard outside of the housing, a locking plate pivotally mounted within the housing, the plate having an opening therein and the pole passing through the opening, the diameter of the opening being larger than the outside diameter of the pole, means to bias the plate at an oblique angle relative to the pole with the opening in the plate gripping the pole to lock the birdhouse and housing thereon, and means operable by the lanyard to release the locking plate to free the birdhouse and housing for movement thereof, said release means comprises a lever bracket pivotally mounted within the housing, the bracket being operably on the plate upon exerting a force on the free end of the lanyard to pivot the plate from the oblique angle relative to the pole and thereby release the birdhouse and housing.

5. The combination as claimed in claim 4 in which the free end of the lanyard passes through the bracket and pulling on the free end at an angle relative to the pole will move the bracket to engage the plate and pivot the same simultaneously with raising the birdhouse and housing on the pole, the bracket being of a generally L-shaped configuration with a first leg adapted to engage the plate and a second substantially enclosed leg extending outside the housing, the free end of the lanyard passing through an opening in the end of the second leg.

6. The combination as claimed in claim 4 in which the means to bias the plate include at least one torsion spring.

* * * * *